(12) United States Patent
Sippel et al.

(10) Patent No.: US 11,131,203 B2
(45) Date of Patent: Sep. 28, 2021

(54) TURBINE WHEEL ASSEMBLY WITH OFFLOADED PLATFORMS AND CERAMIC MATRIX COMPOSITE BLADES

(71) Applicants: Rolls-Royce Corporation, Indianapolis, IN (US); Rolls-Royce North American Technologies Inc., Indianapolis, IN (US)

(72) Inventors: Aaron D. Sippel, Zionsville, IN (US); Ted J. Freeman, Danville, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 224 days.

(21) Appl. No.: 16/142,444

(22) Filed: Sep. 26, 2018

(65) Prior Publication Data

US 2020/0095875 A1 Mar. 26, 2020

(51) Int. Cl.
*F01D 5/32* (2006.01)
*F01D 5/30* (2006.01)
*F01D 5/28* (2006.01)

(52) U.S. Cl.
CPC .......... *F01D 5/326* (2013.01); *F01D 5/3007* (2013.01); *F01D 5/3053* (2013.01); *F01D 5/3084* (2013.01); *F01D 5/284* (2013.01); F05D 2220/3215 (2013.01); F05D 2230/60 (2013.01); F05D 2240/90 (2013.01); F05D 2300/20 (2013.01)

(58) Field of Classification Search
CPC .... F01D 5/3007; F01D 5/3084; F01D 11/008; F01D 5/326; F01D 5/284; F05D 2240/90; F05D 2230/60; F05D 2300/20; F05D 2300/6033; F05D 2220/3215; F05D 2260/30
See application file for complete search history.

(56) References Cited

U.S. PATENT DOCUMENTS

| | | | |
|---|---|---|---|
| 3,014,695 A * | 12/1961 | Rankin | F01D 5/3007 416/220 R |
| 3,801,222 A * | 4/1974 | Violette | F01D 5/3007 416/220 R |
| 7,284,958 B2 | 10/2007 | Dundas et al. | |
| 7,510,379 B2 | 3/2009 | Marusko et al. | |
| 7,874,804 B1 * | 1/2011 | Brown | F01D 5/3007 416/193 A |
| 7,931,442 B1 * | 4/2011 | Liang | F01D 5/3007 416/193 A |
| 8,162,617 B1 | 4/2012 | Davies et al. | |
| 8,408,874 B2 | 4/2013 | McCaffrey et al. | |
| 8,714,932 B2 | 5/2014 | Noe et al. | |
| 8,951,015 B2 | 2/2015 | Brandl et al. | |
| 9,376,916 B2 | 6/2016 | McCaffrey et al. | |

(Continued)

*Primary Examiner* — David Hamaoui
*Assistant Examiner* — Jesse M Prager
(74) *Attorney, Agent, or Firm* — Barnes & Thornburg LLP

(57) ABSTRACT

A wheel assembly for a gas turbine engine includes a disk, a plurality of blades, and a plurality of platforms. The disk is configured to rotate about an axis during operation of the gas turbine engine. Each of the plurality of blades includes a root received in the disk and an airfoil that extends radially away from the root. The platforms are arranged around the blades to define a boundary of a flow path of the gas turbine engine.

10 Claims, 7 Drawing Sheets

(56) References Cited

U.S. PATENT DOCUMENTS

| | | |
|---|---|---|
| 9,404,377 B2 | 8/2016 | Campbell et al. |
| 9,963,979 B2 | 5/2018 | Freeman |
| 2008/0286106 A1 | 11/2008 | Keith et al. |
| 2016/0305260 A1 | 10/2016 | Freeman |

* cited by examiner

TURBINE WHEEL ASSEMBLY WITH OFFLOADED PLATFORMS AND CERAMIC MATRIX COMPOSITE BLADES

FIELD OF THE DISCLOSURE

The present disclosure relates generally to gas turbine engines, and more specifically to wheel assemblies for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

To withstand heat from the combustion products received from the combustor, the turbine may include turbine wheels having blades that comprise composite materials adapted to interact with the hot combustion products. In some turbine wheels, the blades may be coupled to a disk that supports the blades in a gas path of the engine. Supporting and retaining the blades to the disk, for example, may present design challenges.

SUMMARY

The present disclosure may comprise one or more of the following features and combinations thereof.

A wheel assembly for a gas turbine engine may include a disk adapted to rotate about an axis during use of the gas turbine engine, a ceramic blade adapted to interact with gases during use of the gas turbine engine, and a metallic platform. The disk may include a body, a first disk post that extends radially outward away from the body, and a second disk post that extends radially outward away from the disk body. The first disk post may be spaced apart circumferentially from the second disk post to define a dovetail-shaped slot therebetween. The ceramic blade may include a dovetail-shaped root located in the dovetail-shaped slot to couple the ceramic blade with the disk and an airfoil that extends radially away from the dovetail-shaped root.

In some embodiments, the metallic platform may include an outer radial wall arranged around the ceramic blade to define a boundary of a flow path of the gases, a dovetail-shaped first attachment feature that extends radially inward away from the outer radial wall and located in the dovetail-shaped slot to couple the metallic platform with the disk, and a second attachment feature that extends radially inward away from the outer radial wall. The second attachment feature may be spaced apart axially from the dovetail-shaped first attachment feature and coupled with the disk.

In some embodiments, the second attachment feature may be formed to define a dovetail-shaped passage that extends axially through the second attachment feature. The second disk post may be located in the dovetail-shaped passage to couple the second attachment feature with the disk.

In some embodiments, the second attachment feature may include a first leg and a second leg spaced apart circumferentially from the first leg to define at least a portion of the dovetail-shaped passage. The first leg may be located in the dovetail-shaped slot. The second leg may be located in a second dovetail-shaped slot formed in the disk to locate the second disk post circumferentially between the first leg and the second leg.

In some embodiments, the dovetail-shaped root of the ceramic blade may be located axially between the dovetail-shaped first attachment feature and the second attachment feature. In some embodiments, the wheel assembly may further include a pin that extends axially through the second attachment feature and into the second disk post to couple the second attachment feature with the disk.

In some embodiments, the second disk post may include a first face and a second face spaced apart axially from the first face. The second disk post may be formed to include a pin-receiver aperture that extends axially into the first face of the second disk post. The pin may be located in the pin-receiver aperture.

In some embodiments, the second attachment feature may be offset circumferentially from the first attachment feature. In some embodiments, the second attachment feature may be dovetail-shaped when viewed axially and located in the dovetail-shaped slot to couple the second attachment feature with the disk.

According to another aspect of the present disclosure, a wheel assembly for a gas turbine engine may include a disk, a blade, and a platform. The disk may be formed to define a slot that extends axially through the disk. The blade may be located in the slot to couple the blade with the disk In some embodiments, the platform may include an outer radial wall arranged around the blade, a first attachment feature that extends radially inward away from the outer radial wall, and a second attachment feature that extends radially inward away from the outer radial wall. The first attachment feature may be located in the slot such that the disk blocks radial outward movement of the first attachment feature. The second attachment feature may be spaced apart axially from the first attachment feature and coupled with the disk.

In some embodiments, the first attachment feature may be dovetail shaped when viewed axially. The slot may be dovetail shaped when viewed axially.

In some embodiments, the second attachment feature may be dovetail shaped when viewed axially. The second attachment feature may be located in the dovetail shaped slot to couple the second attachment feature with the disk.

In some embodiments, the disk may include a disk body and a disk post that extends radially away from the disk body to define a portion of the slot. The second attachment feature may be formed to define a passage that extends axially through the second attachment feature and the disk post is located in the passage and engaged with the second attachment feature to couple the second attachment feature with the disk.

In some embodiments, the first attachment feature may be dovetail shaped when viewed axially. The slot may be dovetail shaped when viewed axially.

In some embodiments, the disk may include a disk body and a disk post that extends radially away from the disk body to define a portion of the slot. The second attachment feature may include a first leg located in the slot formed in the disk and a second leg that is spaced apart circumferentially from the first leg to locate the disk post circumferentially between the first leg and the second leg.

In some embodiments, the wheel assembly may further include a pin that extends axially through the second attachment feature and into the disk to couple the second attachment feature with the disk. In some embodiments, the second attachment feature may be offset circumferentially from the first attachment feature.

According to another aspect of the present disclosure, a method may include: providing a disk arranged around an axis and formed to define an axially extending slot, a blade having a root and an airfoil that extends radially away from the root, and a platform having an outer radial wall, a first attachment feature that extends radially away from the outer radial wall, and a second attachment feature that extends radially away from the outer radial wall.

In some embodiments, the method may further include arranging the platform around the blade so that the first attachment feature of the platform is aligned axially and radially with the root of the blade. In some embodiments, the method may further include moving axially the platform and the blade relative to the disk to locate the first attachment feature of the platform and the root of the blade in the slot defined by the disk.

In some embodiments, the disk may include a disk body and a disk post that extends radially away from the disk body to define a portion of the slot. The second attachment feature may be formed to define a passage that extends axially through the second attachment feature. The disk post may be located in the passage after the moving step.

In some embodiments, the method may further include providing a pin and inserting the pin through the second attachment feature and into the disk to couple the second attachment feature of the platform with the disk for rotation therewith. In some embodiments, the first attachment feature and the second attachment feature of the platform may be aligned circumferentially and located in the slot to couple the platform with the disk after the moving step.

These and other features of the present disclosure will become more apparent from the following description of the illustrative embodiments.

DETAILED DESCRIPTION OF THE DRAWINGS

Figure 1:
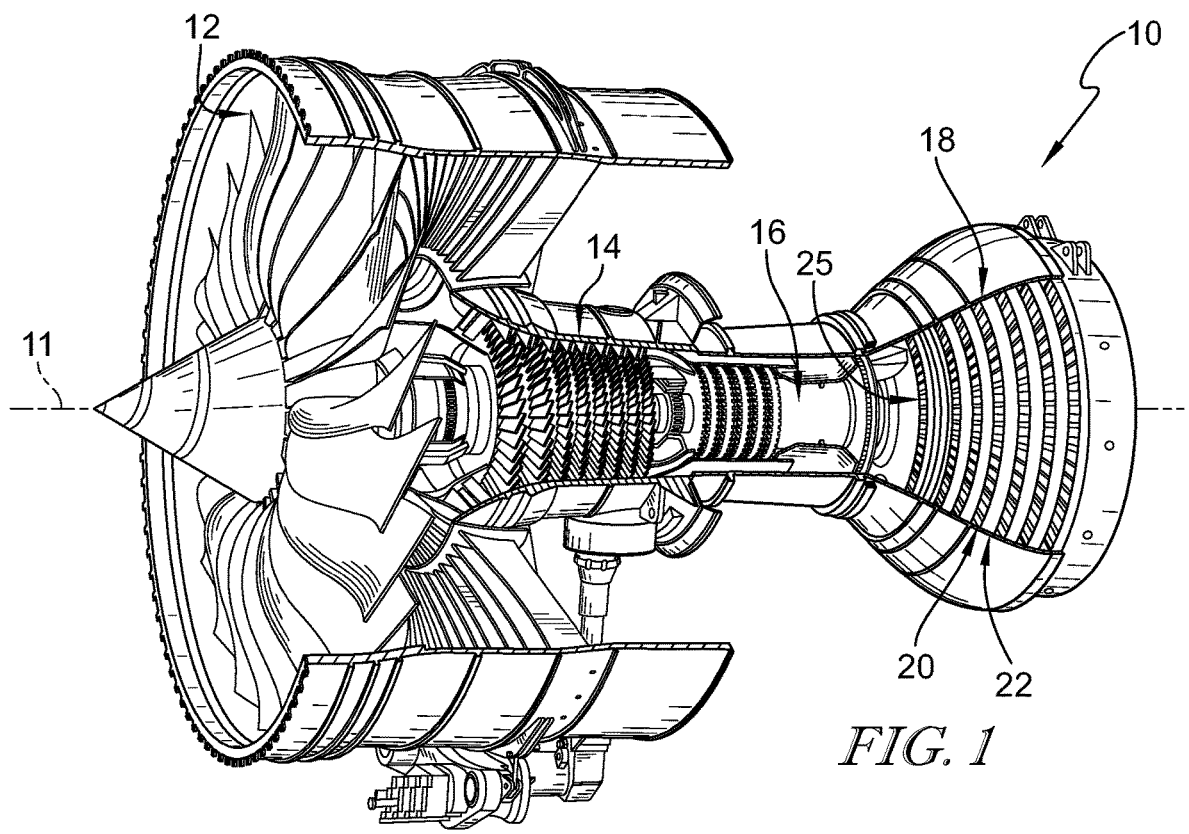
FIG. 1 is a cutaway view of a gas turbine engine that includes a fan, a compressor, a combustor, and a turbine that includes a plurality of turbine wheel assemblies in accordance with the present disclosure that are adapted to extract work from hot combustion products received from the combustor.

For the purposes of promoting an understanding of the principles of the disclosure, reference will now be made to a number of illustrative embodiments illustrated in the drawings and specific language will be used to describe the same.

Figure 2:
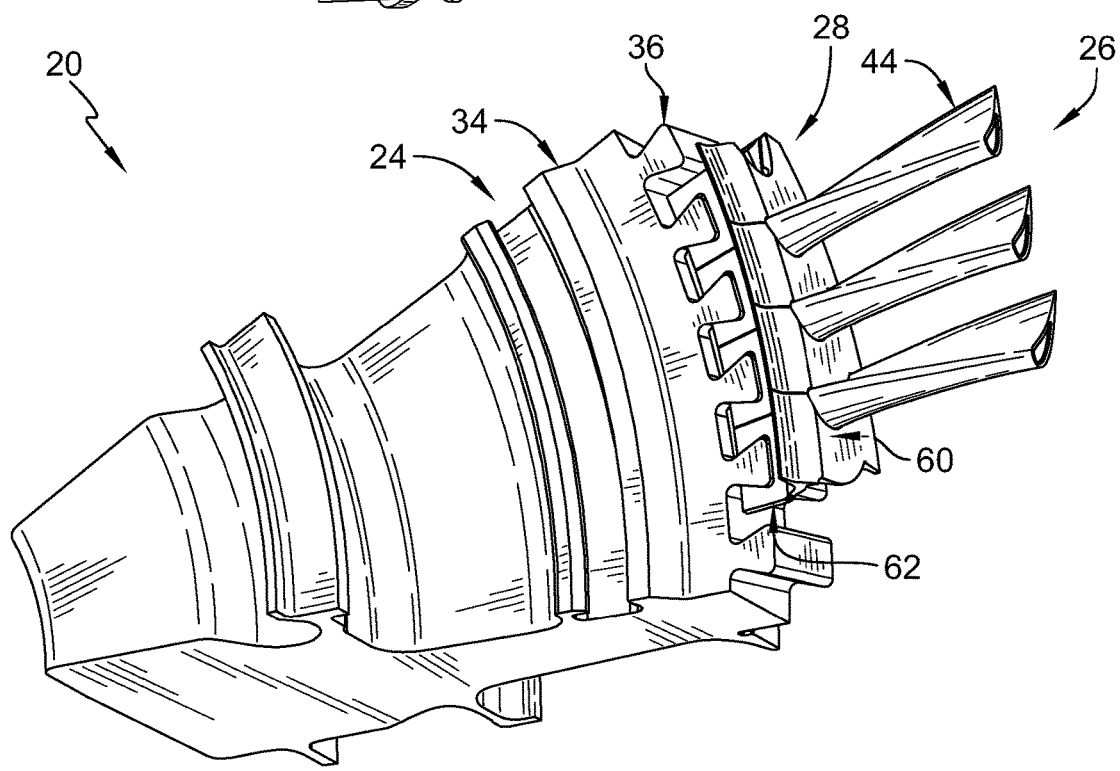
FIG. 2 is a perspective view of a portion of one of the turbine wheel assemblies included in the gas turbine engine of FIG. 1 with portions removed, showing that the turbine wheel assembly includes a disk having disk posts that define a plurality of blade-receiver slots, a plurality of blades each located in a respective blade-receiver slot, and a plurality of platforms located between the blades and coupled to the disk.
Figure 4:
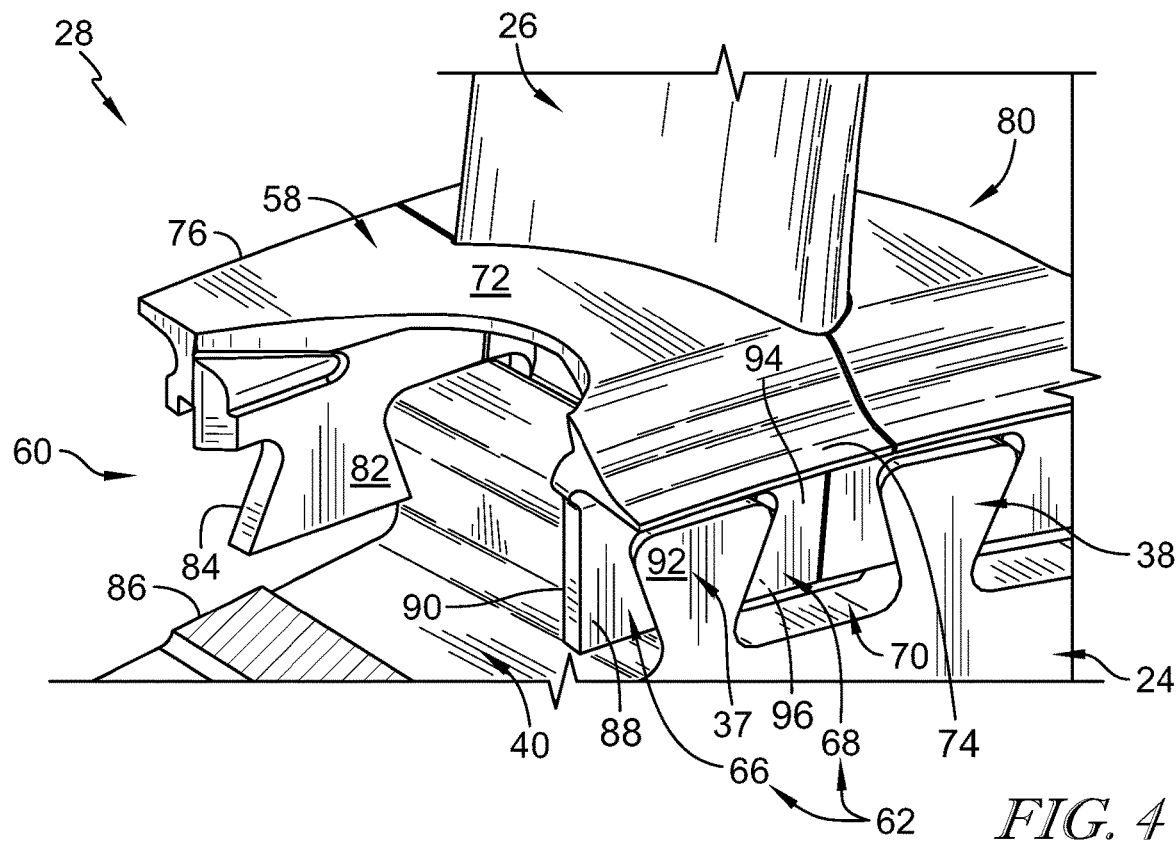
FIG. 4 is an enlarged perspective view of the turbine wheel assembly of FIG. 2 with a portion removed to show that each platform includes a first attachment feature that is dovetail shaped and received in a blade-receiver slot and a second attachment feature that includes a first leg and a second leg that cooperate to define a dovetail-shaped space that receives one of the disk posts to couple the platform with the disk.
Figure 5:
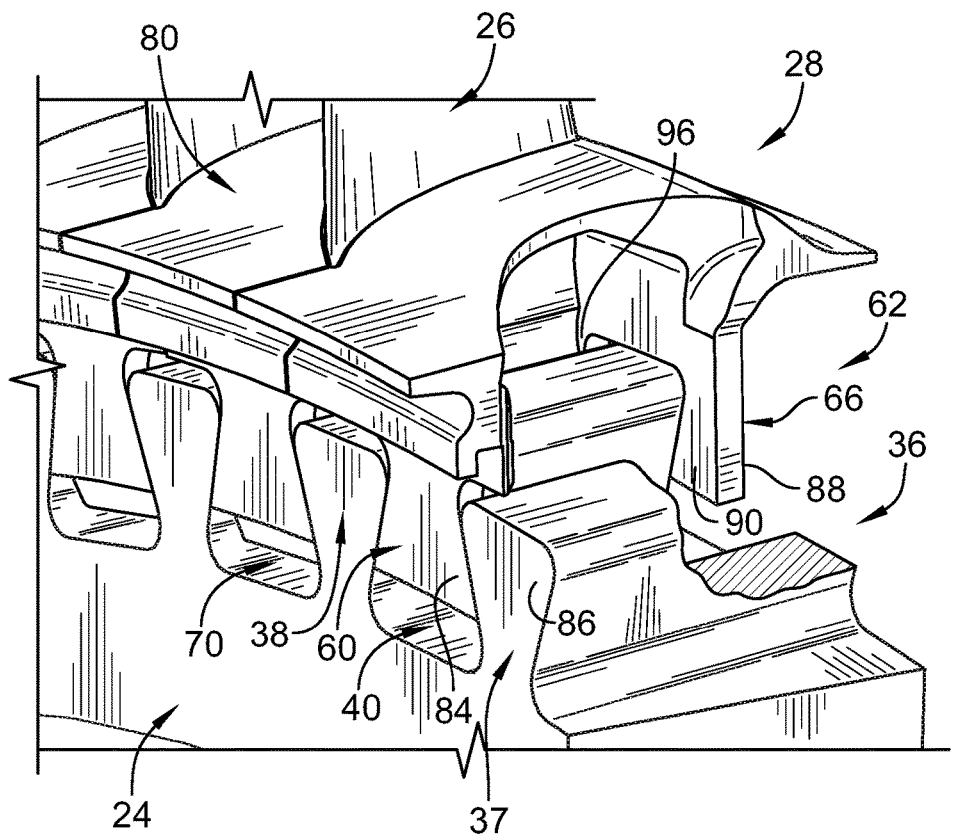
FIG. 5 is an enlarged perspective view of the turbine wheel assembly of FIG. 2 with a portion removed to show that the first attachment feature is dovetail shaped and extends into the slot defined between two disk posts to couple the platform with the disk.

A wheel assembly 20 adapted for use with a gas turbine engine 10 includes a disk 24, a plurality of blades 26, and a plurality of platforms 28 as shown in FIGS. 1 and 2. The disk 24 is adapted to retain the blades 26 and platforms 28 and to extract energy from hot gases as it rotates about a central axis 11 during operation of the gas turbine engine 10. The blades 26 each include a root 42 received in the disk 24 and an airfoil 44 that extends radially away from the root 42 to interact with the gases that flow through the gas turbine engine 10. The platforms 28 are arranged around the blades 26 to define a flow path of the gases and each include attachment features 60, 62 that couple the platforms 28 to the disk 24 as shown in FIGS. 4 and 5.

In some embodiments, one attachment feature of the platform is dovetail shaped and received in the disk while the other attachment feature is formed to include a slot that receives a portion of the disk as shown in FIGS. 2-5. In some embodiments, one attachment feature of the platform is dovetail shaped and received in the disk while the other attachment feature is formed to receive a pin that extends into a portion of the disk to couple the platform with the disk as shown in FIGS. 6-9. In some embodiments, each attachment feature of the platform is dovetail shaped and received in the disk as suggested in FIG. 10. In other embodiments, any combination of attachment features may be used.

The wheel assembly 20 is incorporated in the gas turbine engine 10 which includes a fan 12, a compressor 14, a combustor 16, and a turbine 18 as shown in FIG. 1. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

The turbine 18 includes a plurality of turbine wheel assemblies 20 and turbine vane assemblies 22 as suggested in FIG. 1. A portion of one of the turbine wheel assemblies 20 is shown in FIG. 2. Each turbine wheel assembly 20 is configured to interact with the hot combustion gases from the combustor 16 and rotate about the central axis 11 of the gas turbine engine 10 to generate power for driving the compressor 14 and the fan 12. A turbine vane assembly 22 is located between neighboring turbine wheel assemblies 20 to direct gases received from an upstream turbine wheel assembly 20 toward a downstream turbine wheel assembly 20.

Figure 3:
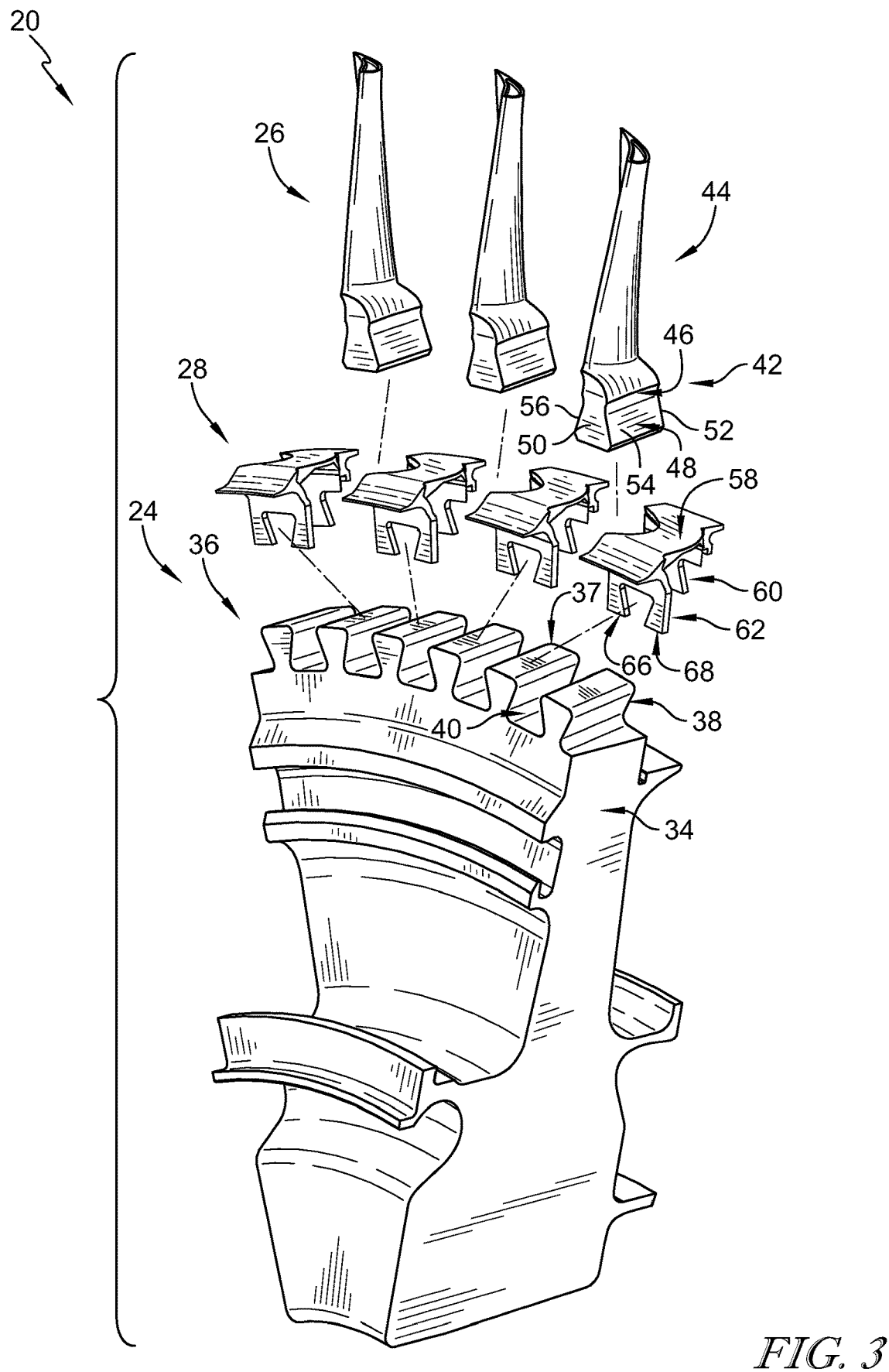
FIG. 3 is an exploded view of the turbine wheel assembly of FIG. 2 showing that the turbine wheel assembly includes, from top to bottom, the plurality of blades, the plurality of platforms, and the disk and suggesting that each blade is configured to be interposed between two adjacent platforms to support and retain each blade in each respective slot.

The turbine wheel assembly 20 of FIG. 2 includes the disk 24, the plurality of blades 26, and the plurality of platforms 28. The disk 24 includes a body 34 and plurality of disk posts 36 that extend radially outward from the body 34 as shown in FIGS. 2 and 3. The body 34 is coupled to the shaft of the gas turbine engine 10 and is adapted to rotate about the central axis 11. The plurality of disk posts 36 extends radially outward away from the body 34 to define a plurality of slots 40.

Illustrative, the plurality of disk posts 36 includes a first disk post 37 that extends radially outward away from the body 34 and a second disk post 38 that extends radially outward away from the disk body 34 as shown in FIG. 3. The first disk post 37 is spaced apart circumferentially from the second disk post 38 to define one of the dovetail-shaped slots 40 therebetween. The slots 40 extend generally axially through the disk 24 and may include a broach angle in which the slots 40 extend axially though are slightly misaligned from the axis 11. The body 34 and the plurality of disk posts 36 are made of metallic materials in the illustrative embodiment.

Each blade 26 includes the root 42 and the airfoil 44 that extends radially away from the root 42 relative to the central axis 11 as suggested in FIGS. 2 and 3. The root 42 of each blade 26 is received in a corresponding one of the dovetail-shaped slots 40 to couple the blades 26 to the disk 24 for rotation with the disk 24. The airfoils 44 are shaped to be pushed circumferentially by the hot gases moving in the flow path 25 to cause the turbine wheel assembly 20 to rotate about the central axis 11 during operation of the gas turbine engine 10.

The root 42 of each blade 26 includes a stem 46 coupled with the airfoil 44 and an attachment feature 48 coupled with the stem 46 as shown in FIG. 3. The attachment feature 48 of the blade 26 is illustratively dovetail shaped when viewed axially relative to the central axis 11. The attachment feature 48 includes a fore-side face 50, an aft-side face 52 spaced apart axially from the fore-side face 50, a first engagement face 54, and a second engagement face 56 spaced apart circumferentially from the first engagement face 54 as shown in FIG. 3. The fore-side face 50 and the aft-side face 52 extend between and interconnect the first engagement face 54 and the second engagement face 56. The fore-side face 50 and the aft-side face 52 are parallel in the illustrative embodiment.

Illustratively, the blades 26 comprise ceramic matrix composite materials. The blade 26 comprises only ceramic matrix composite materials in the illustrative embodiment. In other embodiments, the blades 26 may comprise one or more of ceramic matrix composite materials, composite materials, and metallic materials.

The platforms 28 include an outer radial wall 58, the first attachment feature 60, and the second attachment feature 62 as shown in FIGS. 4 and 5. The outer radial wall 58 is arranged partway around the blade 26 to define the boundary of the flow path 25 of the gases. The first attachment feature 60 extends radially inward away from the outer radial wall 58 and has a dovetail-shaped cross section when viewed in the axial direction relative to the central axis 11. The first attachment feature 60 is located in the dovetail-shaped slot 40 between the first disk post 37 and the second disk post 38. The second attachment feature 62 extends radially inward away from the outer radial wall 58 and is spaced apart axially from the first attachment feature 60.

The first attachment feature 60 engages the first disk post 37 and the second disk post 38 as shown in FIG. 5. The second attachment feature illustratively engages only the second disk post 38. The second attachment feature 62 is formed to define a dovetail-shaped passage 64 that extends axially through the second attachment feature 62. The second disk post 38 is located in the dovetail-shaped passage 64 to couple the second attachment feature 62 with the disk 24. In other embodiments, the first attachment feature 60 may have a different shape and the second attachment feature 62 may be formed with a different shaped passage 64 such as, for example, fir tree shaped.

The second attachment feature 62 includes a first leg 66 and a second leg 68 spaced apart circumferentially from the first leg 66 to define at least a portion of the dovetail-shaped passage as shown in FIG. 4. The first leg 66 is located in the dovetail-shaped slot 40 between the first disk post 37 and the second disk post 38. The second leg 68 is located in a second dovetail-shaped slot 70 formed in the disk 24 to locate the second disk post 38 circumferentially between the first leg 66 and the second leg 68. The dovetail-shaped root 42 of the ceramic blade 26 is located axially between the first attachment feature 60 and the second attachment feature 62.

The first attachment feature 60 engages the aft-side face 52 of the attachment feature 48 of the root 42 of the blade 26. The second leg 68 of the second attachment feature 62 engages the fore-side face 50 of the attachment feature 48 of the root 42 of the blade 26. As such, the first attachment feature 60 and the second attachment feature 62 cooperate to the blade 26 in both axial directions.

In the illustrative embodiment, the turbine wheel assembly 20 includes a plurality of platforms positioned next to one another as shown in FIGS. 4 and 5. The plurality of platforms includes at least platform 28 and a second neighboring platform 80 that is identical to the platform 28 as shown in FIG. 4. As such the same reference numbers are used to describe platform 80 as those used to describe platform 28.

The ceramic blade 26 is interposed between the platforms 28, 80 as shown in FIG. 4. The first attachment feature 60 of each platform 28, 80 is offset circumferentially from at least a portion of the second attachment feature 62 such that each platform 28, 80 is aligned circumferentially with at least two ceramic blades 26. For example, the dovetail-shaped root 42 of the ceramic blade 26 is located axially between the first leg 66 of the second attachment feature 62 of platform 28 and the first attachment feature 60 of platform 80. The dovetail-shaped root 42 of the ceramic blade 26 is also located axially between the second leg 68 of the second attachment feature 62 of platform 80 and the first attachment feature 60 of platform 80. In this way, adjacent platforms 28, 80 cooperate to retain the ceramic blade 26 interposed between platforms 28, 80 in both axial directions. This arrangement of alternating platforms and blades is repeated around the central axis 11 to form the turbine wheel assembly 20.

The outer radial wall 58 of the platform 28 includes a curvilinear panel 72, a fore wing 74, and an aft wing 76 as shown in FIGS. 4 and 5. The panel 72 is configured to be arranged partway around the blades 26. The fore wing 74 extends axially forward away from the panel 72. The aft wing 76 extends axially aft away from the panel 72. The fore wing 74 and the aft wing 76 may engage portions of the turbine vane assemblies 22 located fore and aft of the turbine wheel assembly 20.

The first attachment feature 60 of the platform 28 has a fore-side face 82 and an aft-side face 84 spaced apart axially from the fore-side face 82 as shown in FIGS. 4 and 5. The fore-side face 82 of the attachment feature 60 may engage directly the aft-side face 52 of a blade 26. The aft-side face 84 faces axially away from the blade 26 and is planar with an aft-end 86 of the disk posts 36.

The first leg 66 of second attachment feature 62 of the platform 28 has a fore-side face 88 and an aft-side face 90 spaced apart axially from the fore-side face 88 as shown in FIGS. 4 and 5. The aft-side face 90 of the attachment feature 62 may engage directly the fore-side face 50 of a blade 26. The fore-side face 88 faces axially away from the blade 26 and is planar with a fore-end 92 of the disk posts 36.

The second leg 68 of second attachment feature 62 of the platform 28 has a fore-side face 94 and an aft-side face 96 spaced apart axially from the fore-side face 94 as shown in FIGS. 4 and 5. The aft-side face 96 of the attachment feature 62 may engage directly the fore-side face 50 of another blade 26. The fore-side face 94 faces axially away from the blade 26 and may be flush and planar with the fore-end 92 of the disk posts 36 as shown in FIGS. 4 and 5.

Another embodiment of a turbine wheel assembly 220 in accordance with the present disclosure is shown in FIGS. 6-9. The turbine wheel assembly 220 is substantially similar to the turbine wheel assembly 20 shown in FIGS. 1-5 and described herein. Accordingly, similar reference numbers in the 200 series indicate features that are common between the turbine wheel assembly 20 and the turbine wheel assembly 220. The description of the turbine wheel assembly 20 is incorporated by reference to apply to the turbine wheel assembly 220, except in instances when it conflicts with the specific description and the drawings of the turbine wheel assembly 220.

Figure 6:
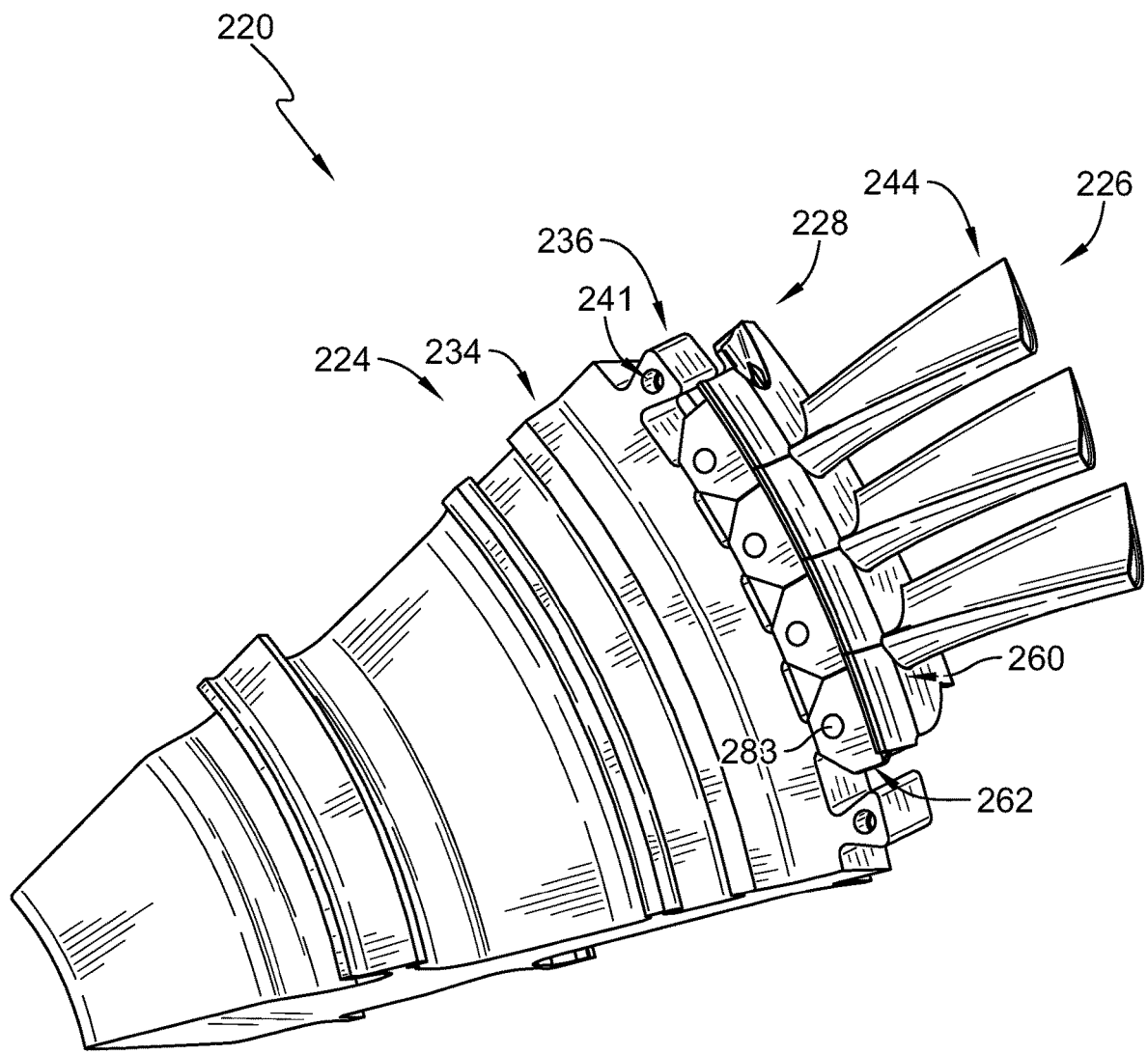
FIG. 6 is a perspective view of a portion of another turbine wheel assembly in accordance with the present disclosure showing that the turbine wheel assembly includes a disk having a disk body and a plurality of disk posts that define axially-extending slots, a plurality of blades each having an axially-extending root located between adjacent disk posts, and a plurality of platforms located between the blades and being pinned to the disk.

The turbine wheel assembly 220 of FIG. 6 includes a disk 224, a plurality of blades 226, and a plurality of platforms 228. The disk 224 is coupled to a shaft of the gas turbine engine 10 and is configured to rotate the shaft about the central axis 11 during operation of the gas turbine engine 10 to generate power. The plurality of blades 226 are shaped to interact with and be rotated by the hot gases that move axially along a flow path 25 of the gas turbine engine 10. The platforms 228 are located between blades 226 and are arranged circumferentially about the disk 224 to form a boundary 230 of the flow path 25 of the gas turbine engine 10.

Figure 7:
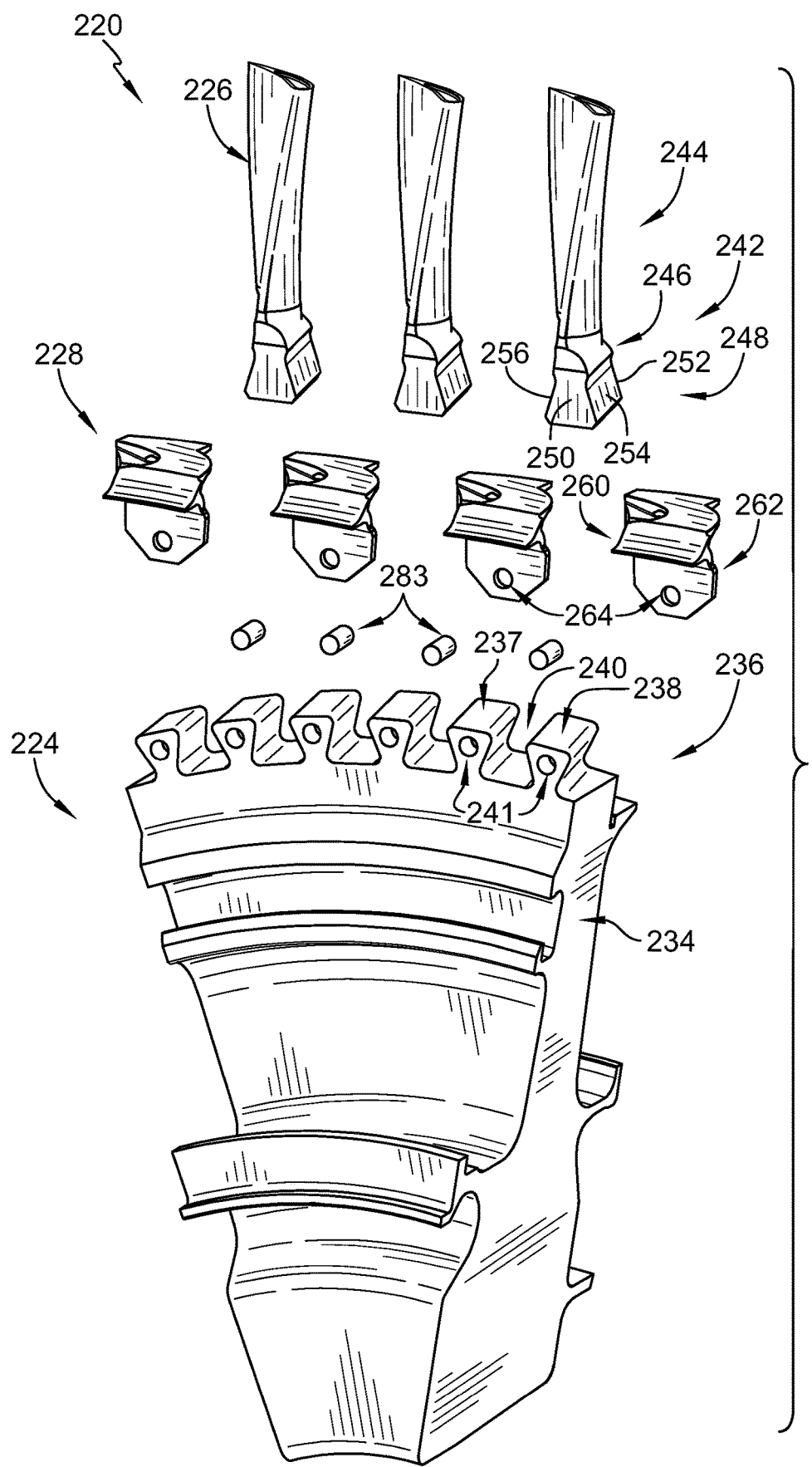
FIG. 7 is an exploded view of the turbine wheel assembly of FIG. 6 showing that the turbine wheel assembly includes, from top to bottom, the plurality of blades, the plurality of platforms, a plurality of pins, and the disk and suggesting that each blade is configured to be interposed between two adjacent platforms to support and retain each blade in each respective slot.

The disk 224 includes a body 234 and plurality of disk posts 236 that extend radially outward from the body 234 as shown in FIGS. 6 and 7. The body 234 is coupled to the shaft of the gas turbine engine 10 and is adapted to rotate about the central axis 11. The plurality of disk posts 236 includes a first disk post 237 that extends radially outward away from the body 234, and a second disk post 238 that extends radially outward away from the disk body 234. The first disk post 237 is spaced apart circumferentially from the second disk post 238 to define a dovetail-shaped slot 240 therebetween. Each of the disk posts 236 is formed to include a pin-receiving aperture 241 that extends axially into the disk posts 236. The body 234 and the plurality of disk posts 236 are made of metallic materials in the illustrative embodiment.

Each blade 226 includes the root 242 and the airfoil 244 that extends radially away from the root 242 relative to the central axis 11 as suggested in FIGS. 6 and 7. The root 242 of each blade 226 is received in the dovetail-shaped slot 240 to couple the blades 226 to the disk 224 for rotation with the disk 224. The airfoils 244 are shaped to be pushed circumferentially by the hot gases moving in the flow path 25 to cause the turbine wheel assembly 20 to rotate about the central axis 11 during operation of the gas turbine engine 10.

The root 242 of each blade 226 includes a stem 246 coupled with the airfoil 244 and an attachment feature 248 coupled with the stem 246 as shown in FIG. 7. The attachment feature 248 of the blade 226 is illustratively dovetail shaped when viewed axially relative to the central axis 11. The attachment feature 248 includes a fore-side face 250, an aft-side face 252 spaced apart axially from the fore-side face 250, a first engagement face 254, and a second engagement face 256 spaced apart circumferentially from the first engagement face 254 as shown in FIG. 7. The fore-side face 250 and the aft-side face 252 extend between and interconnect the first engagement face 254 and the second engagement face 256. The fore-side face 250 and the aft-side face 252 are parallel in the illustrative embodiment.

Illustratively, the blades 226 comprise ceramic matrix composite materials. The blade 226 comprises only ceramic matrix composite materials in the illustrative embodiment. In other embodiments, the blades 226 may comprise one or more of ceramic matrix composite materials, composite materials, and metallic materials.

Figure 8:
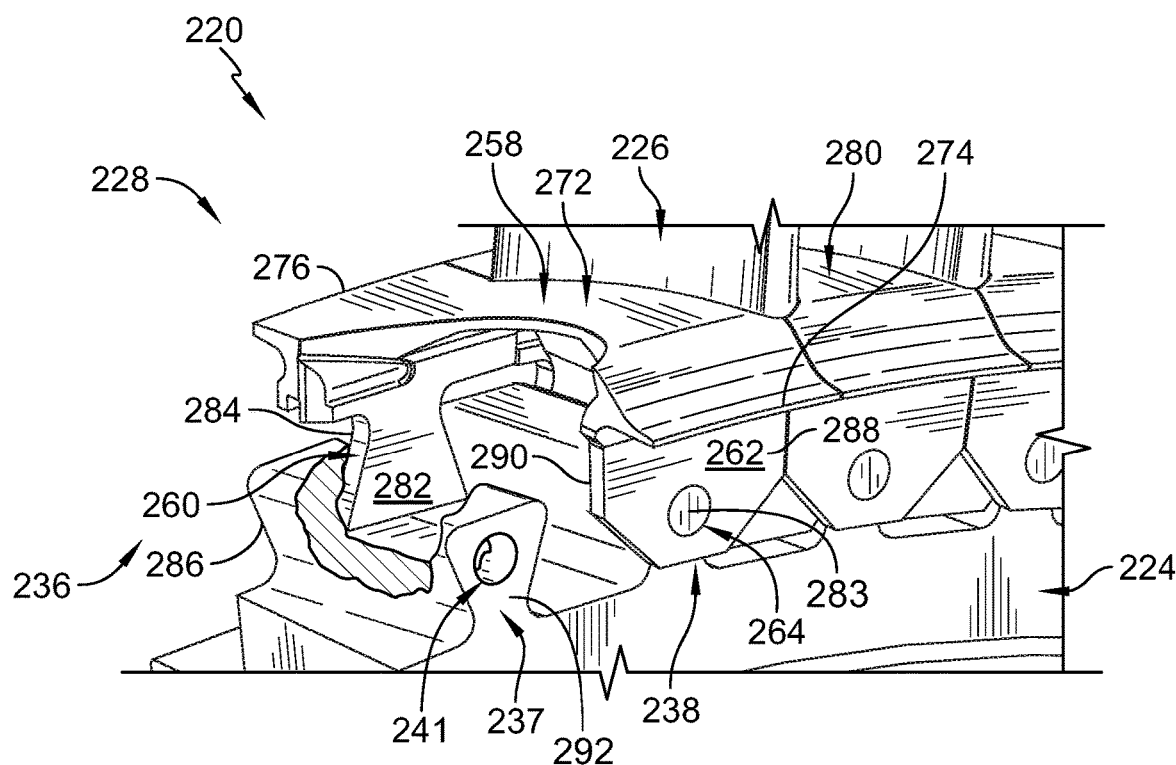
FIG. 8 is an enlarged perspective view of the turbine wheel assembly of FIG. 6 with a portion removed to show that each platform includes a first attachment feature that is dovetail shaped and received in a slot formed in the disk and a second attachment feature formed to include a pin-receiving aperture configured to receive a pin that extends into a disk post to couple the second attachment feature to the disk.
Figure 9:
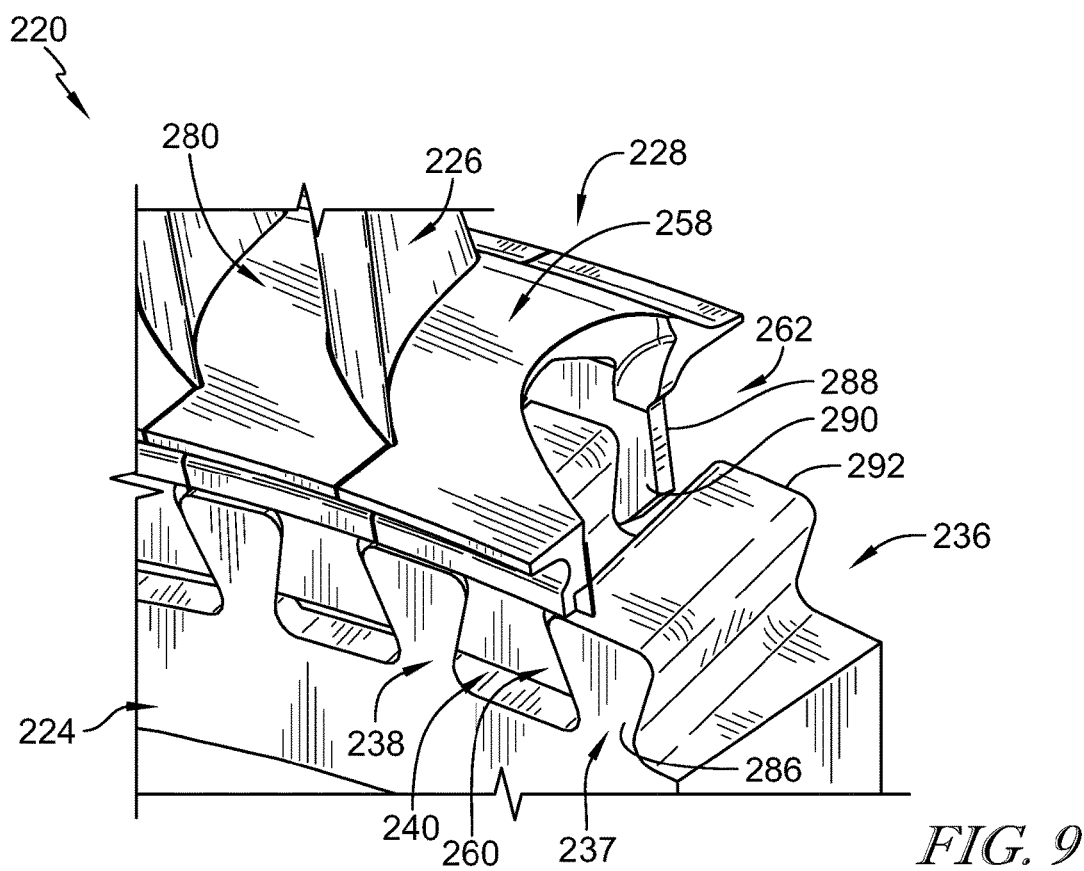
FIG. 9 is an enlarged perspective view of the turbine wheel assembly of FIG. 2 with a portion removed to show that the first attachment feature is dovetail shaped and extends into the slot defined between two disk posts.

The platforms 228 include an outer radial wall 258, a first attachment feature 260, and a second attachment feature 262 as shown in FIGS. 8 and 9. The outer radial wall 258 is arranged partway around the blade 226 to define the boundary of the flow path 25 of the gases. The first attachment feature 260 extends radially inward away from the outer radial wall 258 and has a dovetail-shaped cross section when viewed in the axial direction relative to the central axis 11. The first attachment feature 260 is located in the dovetail-shaped slot 240 between the first disk post 237 and the second disk post 238. The second attachment feature 262 extends radially inward away from the outer radial wall 258 and is spaced apart axially from the first attachment feature 260.

The first attachment feature 260 engages the first disk post 237 and the second disk post 238 while the second attachment feature is coupled to the second disk post 238 as shown in FIG. 8. The second attachment feature 262 is formed to define a pin-receiving aperture 264 that extends axially through the second attachment feature 262. The pin-receiving aperture 264 of the second attachment feature 262 is aligned axially with one of the pin-receiving apertures 241 formed in the disk posts 236. A plurality of pins 283 are provided and extend axially through the pin-receiving aperture 264 of the second attachment feature 262 and into the pin-receiving aperture 241 of the disk post 236 to couple the second attachment feature 262 with the disk 224. The second attachment feature 262 is offset circumferentially from the first attachment feature 260. In other embodiments, the first attachment feature 260 is formed to receive a pin 283 that extends into the disk post 236. In such embodiments, the first attachment feature 260 and the second attachment feature 262 may be aligned circumferentially.

The dovetail-shaped root 242 of the ceramic blade 226 is located axially between the first attachment feature 260 and the second attachment feature 262. For example, the first attachment feature 260 engages the aft-side face 252 of the attachment feature 248. The second attachment feature 262 engages the fore-side face 250 of the attachment feature 248. As such, the first attachment feature 260 and the second attachment feature 262 cooperate to support and retain the blade 226 in both axial directions.

In the illustrative embodiment, the turbine wheel assembly 220 includes a plurality of platforms positioned next to one another as shown in FIGS. 8 and 9. The plurality of platforms includes at least platform 228 and a second neighboring platform 280 that is identical to the platform 228 as shown in FIG. 8. As such the same reference numbers are used to describe platform 280 as the reference numbers used to describe platform 228.

The ceramic blade 226 is interposed between the platforms 228, 280 as shown in FIG. 8. The first attachment feature 260 of each platform 228, 280 is offset circumferentially from at least a portion of the second attachment feature 262 such that each platform 228, 280 engages at least two ceramic blades 226 via their respective attachment features 260, 262. For example, the dovetail-shaped root 242 of the ceramic blade 226 is located axially between a portion of the second attachment feature 262 of platform 228 and the first attachment feature 260 of platform 280. The dovetail-shaped root 242 of the ceramic blade 226 is also located axially between a portion of the second attachment feature 262 of platform 280 and the first attachment feature 260 of platform 280. In this way, adjacent platforms 228, 280 cooperate to support and retain the ceramic blade 26 interposed between platforms 228, 280 in both axial directions. This arrangement of alternating platforms and blades is repeated around the central axis 11 to form the turbine wheel assembly 220.

The outer radial wall 258 of the platform 228 includes a curvilinear panel 272, a fore wing 274, and an aft wing 276 as shown in FIGS. 8 and 9. The panel 272 is configured to be arranged partway around the blades 226. The fore wing 274 extends axially forward away from the panel 272. The aft wing 276 extends axially aft away from the panel 272. The fore wing 274 and the aft wing 276 may engage portions of the turbine vane assemblies 22 located fore and aft of the turbine wheel assembly 220.

The first attachment feature 260 of the platform 228 has a fore-side face 282 and an aft-side face 284 spaced apart axially from the fore-side face 282 as shown in FIGS. 8 and 9. The fore-side face 282 of the attachment feature 260 may engage directly the aft-side face 252 of a blade 226. The aft-side face 284 faces axially away from the blade 226 and is planar with an aft-end 286 of the disk posts 236.

The second attachment feature 262 of the platform 228 has a fore-side face 288 and an aft-side face 290 spaced apart axially from the fore-side face 288 as shown in FIGS. 8 and 9. The aft-side face 290 of the attachment feature 262 may engage directly the fore-side face 250 of two neighboring blades 226. The fore-side face 288 faces axially away from the blades 226 and is spaced apart axially from a fore-end 292 of the disk posts 236.

Figure 10:
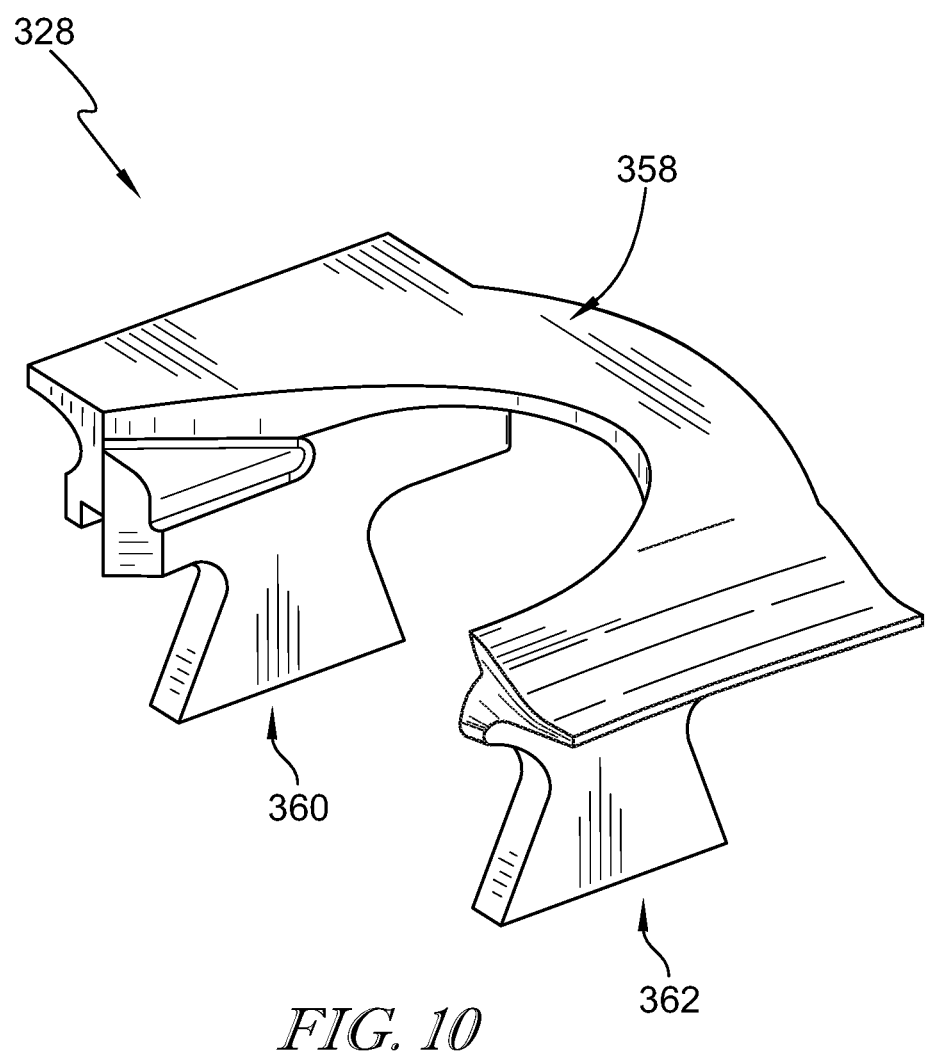
FIG. 10 is a perspective view of another embodiment of a platform in accordance with the present disclosure showing that the platform includes a first attachment feature having a dovetail shape and a second attachment feature having a dovetail shape and showing that the first attachment feature is aligned circumferentially with the second attachment feature.

Another embodiment of a platform 328 in accordance with the present disclosure is shown in FIG. 10. The platform 328 is substantially similar to the platforms 28 and 228 shown in FIGS. 1-9 and described herein. Accordingly, similar reference numbers in the 300 series indicate features that are common between the platforms 28 and 228 and the platform 328. The description of the platforms 28 and 228 is incorporated by reference to apply to the platform 328, except in instances when it conflicts with the specific description and the drawings of the platform 328.

The platform 328 includes an outer radial wall 358, a first attachment feature 360, and a second attachment feature 362 as shown in FIG. 10. The outer radial wall 358 is arranged to define the boundary of the flow path 25 of the gases. The first attachment feature 360 extends radially inward away from the outer radial wall 358 and has a dovetail-shaped cross section when viewed in the axial direction relative to the central axis 11. The second attachment feature 362 extends radially inward away from the outer radial wall 358 has a dovetail-shaped cross section when viewed in the axial direction relative to the central axis 11. The second attachment feature 362 is spaced apart axially from the first attachment feature 360. The second attachment feature 362 is aligned circumferentially with the first attachment feature 360. The first attachment feature 360 and the second attachment feature 362 are arranged to lie in spaced apart relation in a slot (not shown) formed between to neighboring disk posts, such as slot 40 in FIG. 3, to retain a blade 26 therebetween. In other embodiments, the first attachment feature 360, the second attachment feature 362, and the slots formed in the disk have shaped different than dovetail shaped such as, for example, fir tree shape.

According to the present disclosure, platforms 28 are offloaded from the base ceramic matrix composite blades 26 which may reduce the stresses in the ceramic matrix composite blades 26. Moreover, the present disclosure may provide relatively simple features for attaching the platforms 28 that define the inner annulus while maintaining high blade 26 counts. In some embodiments, the disk 24 of a wheel assembly is a conventional disk 24 for use with metallic blades without modifications such that the platforms 28 and blades 26 of the present disclosure may be used with conventional disks. In other embodiments, the disk 24 may be relatively smaller and/or weigh less than conventional disks.

As ceramic matrix composites (CMC) materials and designs mature, they may be used in turbine blade applications. In addition to the ceramic matrix composites being capable of operating at higher temperatures and deliver cooling air savings/SFC reductions to the system, the weight reductions provided over a metallic blade system may be significant. Not only may ceramic matrix composite blades be lighter than metallic blades, but these savings may be multiplied since the size and weight of the disks may be reduced.

The ceramic matrix composites material may allow the weight of the blades 26 to be lower; however there may also a reduction in strength as compared to metallic blades. To plug-and-play a ceramic matrix composite blade with an integral platform like typical blades may be challenging due to the stresses in the attachment. The stress at the attachment of the blade 26 may be done by offloading the platform 28 as shown in FIGS. 2-5. With this configuration, the blade attachment may not support the centrifugal load associated with the platforms 28.

According to the present disclosure, a number of ways to integrate an offloaded platform 28 with a ceramic matrix composites attachment feature in the blade 26 that is generally aligned axially is provided as shown in FIGS. 2-10. In all of the embodiments, the platform 28 may be metallic, ceramic, or ceramic matrix composite. The platforms 28 of the present disclosure are metallic. Metallic platforms 28 may allow for more complex features (angel wings, cover plate retention, etc.) as compared to ceramic and ceramic matrix composite platforms.

The platform components 28 fit between adjacent blades 26 to form the inner annulus of the hot gas flow path 25. In cross section, the platform 28 has a generally upside down U-shape. The platform 28 may include radial legs that extend radially inward from the flow path body on the forward and aft side of the blade 26 for radial and axial retention of the platform 28 with the disk 24 as shown in FIGS. 2-5. One advantage of this design may be that the radial retention features of the platform 28 interface with the same radial retention features in the disk 24 that hold the blade 26.

The illustrative platform radial retention features have been shaped to match the retention feature in the blade 26. Due to the turning associated with the blade, an internal dovetail is used on the aft rail of the platform 28 and an external dovetail is used on the forward rail of the platform 28. In other embodiments, the same retention feature is on both ends of the platform 28.

During assembly, the blades 26 and platforms 28 may be assembled outside of the disk 24 to form a full ring of blades 26 and platforms 28. The ring of components may then slide axially with respect to the disk 24 such that each attachment feature of the blade 26 and platforms 28 interface with an attachment feature in the disk 24. In some embodiments, the axial length of the disk 24 (at the blade attachment) may need to increase over a conventional metallic design.

An alternate method of attaching the platform 228 to a disk 224 is shown in FIGS. 6-9. The forward end of the platform 228 is attached via a pin to the disk post as shown in FIG. 6. One envisioned benefit of this concept is that the legs of the forward, external dovetail may be eliminated and to provide a relatively larger cross section holding onto the platform. The pin may be sized such that it can handle the centrifugal loads associated with the platform 228 in view of the thickness of the disk post.

At least one benefit of the embodiments of FIGS. 6-9 is that a disk may be extended only on the aft side as compared to a typical disk. On the forward side of the disk, the forward rail of the platform 228 slides down over the front face of the disk. The platform of FIGS. 6-9 may be lighter in weight as compared to the platform of FIGS. 2-5. The platform 228 may be axially retained by the forward rail of the platform 228. A coverplate on both the front and aft side may be used to seal and retain axially the blade set.

In some embodiments, the back or both the back and the front of the platforms 228 are pinned. For example, the back and front of the platforms 228 may be pinned depending on the aero definition of the blade. In some embodiments, one or more ends of the platforms could be hooked directly to a cover plate instead of radially retained by the disk slots for the blades. In some embodiments, a sealing and/or damping feature is located between the ceramic matrix composite blades and the platform components to reduce vibrations in the blades during operation of the gas turbine engine 10.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A wheel assembly for a gas turbine engine, the wheel assembly comprising
a disk adapted to rotate about an axis during use of the gas turbine engine, the disk includes a body, a first disk post that extends radially outward away from the body, and a second disk post that extends radially outward away from the disk body, the first disk post being spaced apart circumferentially from the second disk post to define a first dovetail-shaped slot therebetween,
a ceramic blade adapted to interact with gases during use of the gas turbine engine, the ceramic blade including a dovetail-shaped root located in the first dovetail-shaped slot to couple the ceramic blade with the disk and an airfoil that extends radially away from the dovetail-shaped root, and
a metallic platform that includes an outer radial wall arranged around the ceramic blade to define a boundary of a flow path of the gases, a dovetail-shaped first attachment feature that extends radially inward away from the outer radial wall and located in the first dovetail-shaped slot to couple the metallic platform with the disk, and a second attachment feature that extends radially inward away from the outer radial wall, the second attachment feature spaced apart axially from the dovetail-shaped first attachment feature and coupled with the disk,
wherein the second attachment feature includes a first half-dovetail leg and a second half-dovetail leg circumferentially spaced apart from the first half-dovetail, the first half-dovetail leg is located in the first dovetail-shaped slot, and the second half-dovetail leg is located in a second dovetail-shaped slot formed in the disk to locate the second disk post circumferentially between the first half-dovetail leg and the second half-dovetail leg.

2. The wheel assembly of claim 1, wherein the dovetail-shaped root of the ceramic blade is located axially between the dovetail-shaped first attachment feature and the first half-dovetail leg of the second attachment feature.

3. A wheel assembly for a gas turbine engine, the wheel assembly comprising
a disk formed to define a dovetail-shaped slot that extends axially through the disk,
a blade located in the dovetail-shaped slot to couple the blade with the disk, and
a platform that includes an outer radial wall arranged around the blade, a first attachment feature that is dovetail shaped and extends radially inward away from the outer radial wall, and a second attachment feature that extends radially inward away from the outer radial wall, the first attachment feature is located in the dovetail-shaped slot such that the disk blocks radial outward movement of the first attachment feature, and the second attachment feature being spaced apart axially from the first attachment feature and coupled with the disk, wherein the second attachment feature includes a first half-dovetail leg located in the dovetail-shaped slot formed in the disk and a second half-dovetail leg that is spaced apart circumferentially from the first half-dovetail leg and located in a second slot formed in the disk, wherein the wheel assembly further comprises a second platform that includes a second outer radial wall, a third attachment feature that extends radially inward away from the second outer radial wall, and a fourth attachment feature that extends radially inward away from the second outer wall, the fourth attachment feature includes a half-dovetail third leg and a half-dovetail fourth leg that is spaced apart circumferentially from the third half-dovetail leg and located in the dovetail-shaped slot so that the first half-dovetail leg of the second attachment feature and the fourth half-dovetail leg of the fourth attachment feature are axially aligned and the first half-dovetail leg fills a portion of the dovetail-shaped slot and the fourth half-dovetail leg fills a remaining portion of the dovetail-shaped slot.

4. The wheel assembly of claim 3, wherein the first attachment feature is dovetail shaped when viewed axially and the slot is dovetail shaped when viewed axially.

5. The wheel assembly of claim 4, wherein the second attachment feature is formed to define an external dovetail when viewed axially.

6. The wheel assembly of claim 3, wherein the disk includes a disk body and a disk post that extends radially away from the disk body to define a portion of the slot, the second attachment feature is formed to define a passage between the first leg and the second leg and the disk post is located in the passage and engaged with the second attachment feature to couple the second attachment feature with the disk.

7. The wheel assembly of claim 6, wherein the first attachment feature is dovetail shaped when viewed axially and the slot is dovetail shaped when viewed axially.

8. The wheel assembly of claim 3, wherein the disk includes a disk body and a disk post that extends radially away from the disk body to define a portion of the slot and the disk post is located circumferentially between the first leg and the second leg.

9. A method comprising providing a disk arranged around an axis, the disk including a disk body and a disk post that extend radially away from the disk body, and the disk is formed to define a first axially extending dovetail-shaped slot and a second axially extending dovetail-shaped slot circumferentially spaced apart from the first axially extending dovetail-shaped slot by the disk post, a blade having a root and an airfoil that extends radially away from the root, and a platform having an outer radial wall, a first attachment feature that is dovetail-shaped and extends radially away from the outer radial wall, and a second attachment feature that extends radially away from the outer radial wall and formed to define a passage that extends axially through the second attachment feature, arranging the platform around the blade so that the first attachment feature of the platform is aligned axially and radially with the root of the blade, moving axially the platform and the blade relative to the disk to locate the first attachment feature of the platform and the root of the blade in the first axially extending dovetail-shaped slot defined by the disk, arranging the second attachment feature so that the platform turns circumferentially along an axial length of the platform and the disk post is located in the passage of the second attachment feature and the disk post retained the second attachment feature, wherein the second attachment feature includes a first half-dovetail leg located in the first axially extending dovetail-shaped slot and a second half-dovetail leg spaced apart circumferentially from the first leg and located in the second axially extending dovetail-shaped slot.

10. The method of claim 9, further comprising the step of arranging a second platform in the disk circumferentially adjacent to the platform, wherein the second platform includes a second outer radial wall, a third attachment feature that extends radially away from the outer radial wall and located in the second axially-extending slot, and a fourth attachment feature that extends radially away from the outer radial wall and formed to define a passage that extends axially through the fourth attachment.

* * * * *